Figure 1:
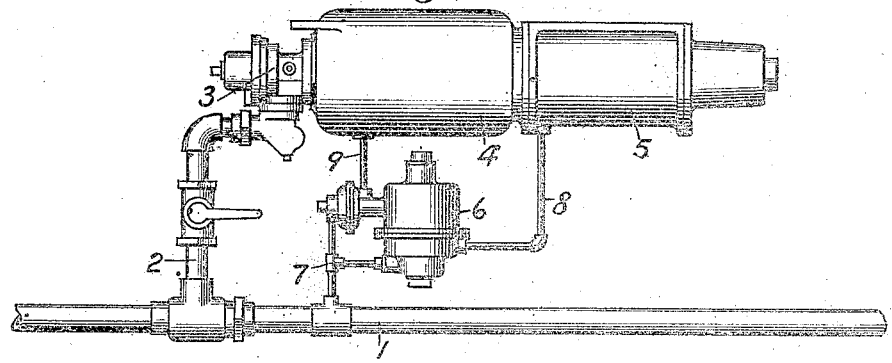

No. 857,911. PATENTED JUNE 25, 1907.
W. V. TURNER & R. H. BLACKALL.
FLUID PRESSURE BRAKE.
APPLICATION FILED SEPT. 26, 1903.

WITNESSES
Jas. B. MacDonald.

INVENTORS
Walter V. Turner
Robert H. Blackall
by E. Wright Att'y.

UNITED STATES PATENT OFFICE.

WALTER V. TURNER, OF WILKINSBURG, AND ROBERT H. BLACKALL, OF EDGEWOOD PARK, PENNSYLVANIA, ASSIGNORS TO THE WESTINGHOUSE AIR BRAKE COMPANY, OF PITTSBURG, PENNSYLVANIA, A CORPORATION OF PENNSYLVANIA.

FLUID-PRESSURE BRAKE.

No. 857,911.   Specification of Letters Patent.   Patented June 25, 1907.

Application filed September 26, 1903. Serial No. 174,710.

*To all whom it may concern:*

Be it known that we, WALTER V. TURNER and ROBERT H. BLACKALL, citizen of the United States, residing, respectively, at Wilkinsburg and Edgewood Park, both in the county of Allegheny and State of Pennsylvania, have invented a certain new and useful Improvement in Fluid-Pressure Brakes, of which improvement the following is a specification.

This invention relates to fluid pressure brakes, and more particularly to means for maintaining the pressure in the brake cylinder during the time that the brakes remain applied such as shown in prior patent 834,342 of Oct. 30, 1906.

In the operation of trains down long grades, it is necessary to hold the brakes applied for comparatively long periods, during which time the pressure leaks away more or less from the brake cylinder, and, as is well known by those familiar with the present standard automatic air brake apparatus, this condition of things necessitates further and often repeated reductions of train pipe pressure for the purpose of supplying the brake cylinder from the auxiliary reservoir to compensate for such leakage and keep up sufficient pressure in the brake cylinder to safely control the speed of the train. This continued drain upon the auxiliary reservoir often causes a depletion of the pressure therein to such a point that it becomes necessary to release the brakes in order to recharge the auxiliary reservoirs, which is a very dangerous condition, since the train may gain such headway during the time of recharging with brakes released as to get beyond control. According to the above mentioned prior patent 834,342 these difficulties are overcome by providing a valve device operated by the opposing pressures of a maintaining chamber and the brake cylinder for controlling the supply of fluid to the brake cylinder while the brakes remain applied and thereby compensate for the leakage, the release of fluid from said maintaining chamber being controlled by the triple valve device.

The object of our present invention is to provide a valve means operatively separate from the triple valve for releasing fluid from the maintaining chamber and also from the brake cylinder when the train pipe pressure is increased for the purpose of releasing the brakes, whereby this fluid will be discharged even though the triple valve should stick or for any reason fail to move to release position at that time.

Figure 2:
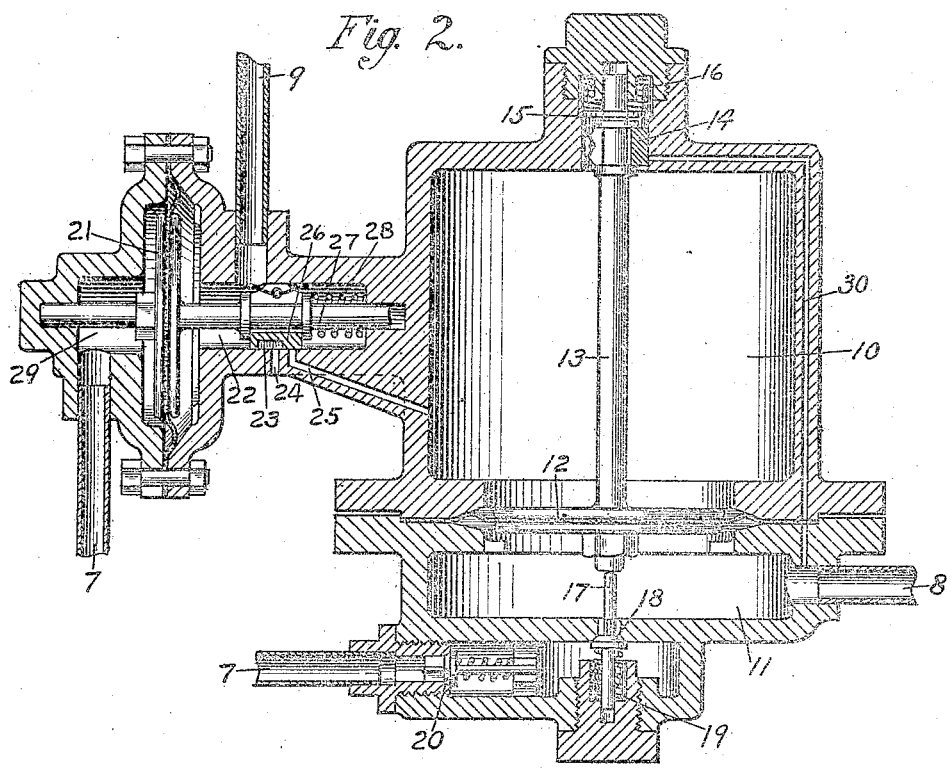

In the accompanying drawing, Figure 1 shows diagrammatically a standard car equipment of air brake apparatus with our improvement applied thereto; and Fig. 2 shows a central sectional view of one form of our improved valve device upon a larger scale.

The usual standard air brake equipment as applied to cars comprises the train pipe 1, having branch pipe 2, connected to the triple valve device 3, auxiliary reservoir 4, and brake cylinder 5. According to said prior patent the construction comprises a valve device 6, connected to the train pipe by pipe 7, and to the brake cylinder by pipe 8. The casing of the device contains the two chambers 10 and 11 separated by the movable diaphragm 12 having a stem 13, which operates the valve 14 for controlling the equalizing passage or port 30 around the diaphragm from the brake cylinder chamber 11 to the maintaining chamber 10, and is also arranged to engage the stem 17 of the regulating valve 18 which is normally held closed by the spring 19 and controls the supply of air under pressure from the train pipe and pipe 7 to the chamber 11 and through pipe 8 to the brake cylinder. A check valve 20 is located in the pipe 7 to prevent a return flow from the brake cylinder to the train pipe in case of an emergency application of the brakes, due to a bursted hose or other accident.

A light spring 16, and washer 15, may be used for returning the diaphragm 12 and its stem 13 to normal position, as shown, when the pressures in the two chambers are equal, and the washer is preferably arranged to rest upon a shoulder of the casing in this position, so as to prevent any tendency of spring 16 to open the valve 18.

In the device as disclosed in said prior patent, the release of fluid from the maintaining chamber 10 is governed by the triple valve, but according to our present improvement a separate valve device is provided for this purpose. A preferred form of such device may comprise a casing containing a diaphragm 21, a chamber 29 communicating through pipe 7 with the train pipe, and chamber 22 which communicates through pipe 9 with the auxiliary reservoir and also contains the valve 26 operated by the stem 27 of the diaphragm 21. In the slide valve 26 is formed a cavity 23, which is adapted to connect the ports 25 and 24 for releasing the compressed air from the chamber 10 to the atmosphere when diaphragm is moved forward under an increase of train pipe pressure, a light spring 28 being employed for normally holding the valve in position shown with the port 25 closed.

The operation of the device is as follows:— When a reduction in train pipe pressure is made in the usual way for applying the brakes the diaphragm 21 remains in position shown, since its stem acts as a stop against the casing, and consequently the port 25 remains closed, at the same time air under pressure from the brake cylinder enters chamber 11 through pipe 8 and raising diaphragm 12 opens valve 14 and equalizes through passage 30 into the maintaining chamber 10. The diaphragm then returns under pressure of spring 16 to its normal position, thus closing valve 14 and sealing up the air in chamber 10 at precisely the same degree of pressure as that of the brake cylinder. If, now, the brakes are held applied for some time and the brake cylinder pressure is diminished from leakage, the constant pressure of chamber 10 will cause a depression of the diaphragm 12 and valve 18 so as to supply a sufficient amount of air under pressure from the train pipe to the brake cylinder to compensate for such leakage and maintain the brake cylinder pressure constant and equal to that held sealed up in chamber 10, it being understood that any desirable means may be employed for supplying fluid to the train pipe. When the train pipe pressure is increased for releasing the brakes the triple valve moves to release position in the usual way for discharging the brake cylinder to the atmosphere, and at the same time the increased pressure in chamber 29 operates to move the diaphragm 21 and valve 26 to establish communication between ports 25 and 24 and thus release the compressed air from chamber 10 to the atmosphere.

If for any reason the triple valve should stick and fail to release the brake, the air discharging from the chamber 10 would permit the raising of the diaphragm 12 and valve 14 to open the port 30, through which the brake cylinder pressure would then be released to the atmosphere through chamber 10 and ports 25 and 24. In this way the necessity of bleeding the auxiliary reservoir and brake cylinder in the case of a defective triple valve is avoided.

By means of this construction, it will now be apparent that the brakes may be held applied for any desired length of time and the brake cylinder pressure constantly maintained at any desired degree without further depleting the auxiliary reservoirs or necessitating the release of the brakes for the purpose of recharging said reservoirs. It will also be seen that the improved device is entirely independent in its action and may be applied directly to the present standard automatic air brake system without changing the structure or interfering in any way with the operation of any of the parts of said system.

Having now described our invention, what we claim as new and desire to secure by Letters Patent is:—

1. In a fluid pressure brake, the combination with a train pipe, auxiliary reservoir, triple valve and brake cylinder, of a valve device operated by the pressure in a maintaining chamber for controlling the supply of fluid to the brake cylinder while the brakes are applied, and means operated by an increase in train pipe pressure for releasing fluid from said chamber.

2. In a fluid pressure brake, the combination with a train pipe, auxiliary reservoir, triple valve and brake cylinder, of a valve device operated by the pressure in a maintaining chamber for controlling the supply of fluid to the brake cylinder while the brakes are applied, and means operated by an increase in train pipe pressure independent of the movement of the triple valve for releasing fluid from said chamber and from the brake cylinder.

3. In a fluid pressure brake, the combination with a train pipe, auxiliary reservoir, triple valve, and brake cylinder, of a valve device having a diaphragm subject to the opposing pressures of the brake cylinder and a fluid pressure chamber for controlling the supply of fluid to the brake cylinder while the brakes are applied, and means operated by an increase of train pipe pressure for releasing the fluid from said chamber.

4. In a fluid pressure brake, the combination with a train pipe, auxiliary reservoir, triple valve, and brake cylinder, of a maintaining chamber having a diaphragm exposed to brake cylinder pressure, a valve operated by the diaphragm for controlling the supply of fluid to the brake cylinder, and means operated by the train pipe and auxiliary reservoir pressures for releasing the fluid from the maintaining chamber.

5. In a fluid pressure brake, the combination with a train pipe, auxiliary reservoir, triple valve, and brake cylinder, of a maintaining chamber, means subject to the opposing pressures of the maintaining chamber and the brake cylinder for controlling the supply of fluid from the train pipe to the brake cylinder, and means operated by an increase of train pipe pressure for releasing the fluid from the maintaining chamber.

6. In a fluid pressure brake, the combination with a train pipe, auxiliary reservoir, triple valve, and brake cylinder, of a valve for controlling the supply of fluid to the brake cylinder while the brakes are applied, means subject to the opposing pressures of the brake cylinder and a constant pressure for operating said valve, and means operated by an increase of train pipe pressure for releasing said constant pressure.

7. In a fluid pressure brake, the combination with a train pipe, auxiliary reservoir, triple valve, and brake cylinder, of a maintaining chamber, means subject to the opposing pressures of said chamber and the brake cylinder for controlling the supply of fluid to the brake cylinder, and a valve device operated by the opposing pressures of the train pipe and the auxiliary reservoir for releasing the fluid from the maintaining chamber.

8. In a fluid pressure brake, the combination with a train pipe, auxiliary reservoir, triple valve, and brake cylinder, of a maintaining chamber, means subject to the opposing pressures of said chamber and the brake cylinder for controlling the supply of fluid to the brake cylinder, means for charging said chamber with a pressure equal to the desired brake cylinder pressure, and a valve device operated by an increase of train pipe pressure for releasing said chamber.

9. In a fluid pressure brake, the combination with a train pipe, auxiliary reservoir, triple valve, and brake cylinder, of a maintaining chamber having a valve controlled equalizing passage communicating with the brake cylinder, means operated by the opposing pressures of said chamber and the brake cylinder for controlling the supply of fluid to the brake cylinder, and a valve device operated by an increase of train pipe pressure for releasing the fluid from said chamber.

10. In a fluid pressure brake, the combination with a train pipe, auxiliary reservoir, triple valve, and brake cylinder, of a maintaining chamber, means subject to the opposing pressures of said chamber and the brake cylinder for controlling the supply of fluid to the brake cylinder, means for charging said chamber with a pressure equal to the desired brake cylinder pressure, a release valve for said chamber, and a diaphragm subject to the opposing pressures of the train pipe and the auxiliary reservoir for operating said release valve.

In testimony whereof we have hereunto set our hands.

WALTER V. TURNER.
ROBERT H. BLACKALL.

Witnesses:
  R. F. EMERY,
  JAS. B. MacDONALD.